Patented Dec. 30, 1930

1,786,559

UNITED STATES PATENT OFFICE

PHILIPP BORN, OF BAD HOMBURG, GERMANY, ASSIGNOR, BY MESNE ASSIGNMENTS, TO THE FIRM OF NAAMLOOZE VENNOOTSCHAP NEDERLANDSCHE GRUYÈRE-BLOKMELK FABRIEK, OF ZWOLLE, NETHERLANDS

PROCESS FOR THE PRODUCTION OF SOLID MILK AND CREAM PREPARATIONS

No Drawing. Application filed February 26, 1926, Serial No. 90,973, and in Germany February 27, 192_.

The purpose of this invention is the production of durable milk and cream preparations. Numerous proposals have already been made for the reduction of milk or cream to a solid form by the extraction of water. Experiments have been made, e. g. for evaporating the aqueous starting material in a vacuum until a more or less solid mass is obtained. In order to facilitate the removal of the water, a common process consisted in adding to the milk substances such as dry milk-powder refined sugar in crystals after it had been freed from the main quantity of the water, whereupon the mixture obtained was completely dried up and the lumps thus produced were pulverized, e. g. by grinding them. It has further been proposed to compress milk-powder into blocks or tablets. Finally it has tried to consolidate condensed milk, or mixtures of condensed milk with other substances, as e. g. cocoa, by enclosing them in capsules or similar coverings made, e. g., of gelatin or of sugar-ice, or in several covers, e. g. in a gelatin capsule provided with icing.

Of all these experiments made for producing solid, durable milk- or cream-preparations, it is only the production of milk- and cream-powder which has attained technical and economical importance.

The milk-powders being producible in a comparatively easy way, according to modern methods, have been applied to various industrial purposes, for instance to the production of milk-chocolate as well as to domestic purposes; they have, however, the great disadvantage of their durability being very limited, especially in the warm summer months or in case that their storage is unfavourable. In particular, this refers to whole-milk-powder and, in a higher degree, to cream-powder.

The applicant has undertaken the task of producing solid milk- and cream-preparations surpassing those hitherto known both as regards their durability and their applicability. Trials and researches made during many years have resulted in the fact that none of the processes usual till now could yield products truly satisfactory, whereas excellent results excelling the yields hitherto realized may be obtained by means of a suitable combination of measures partly known in themselves.

The invention may e. g. be carried out by extracting the water from milk, or from milk enriched in its fat content (cream), by treating it in vacuum apparatuses with stirrers, until a milky mass practically freed from water is formed. In this proceeding the initial material should preferably be subjected to a process of sterilization, e. g. by pasteurizing it, previous to or during the process of dehydration, and be mixed with an appropriate amount of sugar.

The dehydrated material, generally containing not more than 10%, but preferably a smaller quantity of water, is now reduced to the shape of blocks and supplied with protective covers, after the milky mass has cooled down. It has proved very important to let the blocks cool down as much as possible, i. e. through the whole of the mass, before the protective covers are laid on. Numerous experiments have shown that blocks coated with protective covers when still warm will easily decay.

*Example 1*

Fresh whole-milk is pasteurized e. g. by heating it to 70° C. and by evaporating it to a water content of e. g. 6–8% after adding a suitable quantity of a syrup-like sugar-solution produced by boiling sugar with little water, this evaporation being effected in vacuum apparatuses with stirrers at temperatures preferably kept below 50° C. and lying, e. g., between 36–42° C. The mass thus obtained is put in moulds, while in a warm state, and subjected to pressure. After the blocks have cooled down throughout the mass, the protective coverings are laid on.

*Example 2*

Fresh whole-milk is pasteurized and, with a view to the enrichment of the fat content, a suitable quantity of milk-fat is added, e. g. in form of cream, which should likewise be pasteurized or sterilized, and preferably also homogenized. Further the adequate amount of sugar is added. Instead of admixing cream or fresh milk, one may as well operate the process by first evaporating pasteurized fresh milk itself with or without the addition of sugar, e. g. to a fat content of 8–16%, whereupon some cream has still to be added. In both cases the subsequent treatment corresponds to that displayed in Example 1.

Moreover, when boiling down milk of a concentrated fat content, one has found the suprising advantage that the extraction of water goes on both more easily and more quickly than with an equal quantity of ordinary milk treated under the same conditions in other respects.

It has been shown that the product may be given a very fine aroma by admixing certain amounts of butter fat. Therefore it is advisable, in a given case to impart melted, or emulsified butter to the milk, or to the milk having a concentrated fat content, previous to or during the process of evaporation.

Among other advantages, cocoa-butter has proved to be an excellent means of preserving the milk- and cream-blocks. It may be spread on, e. g., by dipping the cooled blocks into melted cocoa-butter or by coating the surface of the blocks with melted cocoa-butter or with a suitable solution of cocoa-butter if necessary several times. In certain cases, the cocoa-butter may be substituted, partially or completely, by other fats easily meltable when heated, and congealing when cooling down, as e. g. cocoanut-oil and similar hard fats. Moreover supplementary substances may be admixed to the fats or fat-mixtures, e. g. such as have a preserving effect, or as will improve the smell and the taste or else act in various ways. For example, vanillin is a preserving supplementary agent which, at the same time, will improve the smell. This substance may e. g. be admixed to the cocoa-butter, or the like, or it may as well be applied separately, for instance in such a way that the block is first coated with an alcoholic solution of vanillin, whereupon the cocoa-butter covering is laid on.

We may likewise take into consideration, as other preservatives, e. g. cocoa-mass, which is obtained in a liquid form from torrefied peeled cocoa-beans treated with heated rollers, and which may eventually be combined with cocoa-butter or sugar, or with both; also suitable mixtures of sugar and starch syrup which have preferably first been subjected to a centrifugal process. Moreover it has also proved feasible to preserve the milk-block e. g. by treating its surface with preserving matters, such as alcohol, in which some small amounts of preservative or disinfecting substances may be dissolved, as e. g. vanillin. Owing to this way of treatment, particularly if the latter is repeated several times, the uppermost layer of the block itself is, as it were, converted into a protective layer.

According to one form of carrying the invention into effect, the mould is smeared over with cocoa-butter or the like, before the milky mass is laid in. A coating will then be formed by the melting and the subsequent congealing of the cocoa-butter, after the warm lacteal mass has been put in. However, during this process, one face, preferably the surface of the block, is first left free and only covered with cocoa-butter, or the like, after the block has completely cooled down.

In accordance with another way of carrying out the invention, the milk or the cream is mixed, previous to or in the course of the extraction of the water, with a certain percentage of cocoa-butter or of fat-mixtures containing the same, or while admixing substances such as vanillin, preferably in such a manner that melted cocoa-butter is homogenized in itself or in combination with milk or cream. Through this admixture, too, the durability of the mill-block can be increased. Also in such cases it has, however, proved expedient to coat the ready-made blocks with protective layers.

Indeed, it is already known how to extract the butter-fat, wholly or to a considerable extent, from whole-milk and to substitute it by other fats, e. g. also cocoa-butter and eventually some ferments. But in that case the fat content of the finished product chiefly consists of those additional fats, whereas, in the present case, the valuable milk-fat is conserved or even enriched, while only comparatively small amounts of cocoa-butter are added, which are merely intended for the preservation of the milk-fat.

This invention admits of the production of highly valuable milk- and cream-preparations being distinguished by excellent properties considerably excelling the solid milk-products hitherto known. The milk- and cream-blocks made in conformity with the invention show, to a great extent, the qualities of fresh milk and of fresh cream respectively. Particularly we must mention that, after many months, they still have the fine aroma as well as the superior taste of the fresh material. The milk- or cream-blocks have proved especially suitable for a further industrial application, e. g. for the production of milk-chocolate, cream-chocolate, milk-pralines, cream-pralines, cream bon-bons and the like. When used in this form, they are by far superior to the condensed milk or powder-milk hitherto in use.

In the appended claims, the term "milk" is also intended to include "cream".

Claims:

1. Process for making solid, stable milk and cream preparations which consists in heating the milk with stirring in a vacuum until enough water is removed to cause the milk to form a mass capable of holding its shape, forming the resulting milk mass into blocks, and providing the blocks with a coating of a substance adapted to protect them from atmospheric agents.

2. Process for making solid, stable milk and cream preparations which consists in heating the milk, together with added sugar, with stirring in a vacuum until enough water is removed to cause the milk to form a mass capable of holding its shape, forming the resulting milk mass into blocks, and providing the blocks with a coating of a substance adapted to protect them from atmospheric agents.

3. Process for making solid, stable milk and cream preparations which consists in pasteurizing the milk, thereafter heating it together with added sugar, with stirring in a vacuum until enough water is removed to cause the milk to form a mass capable of holding its shape, forming the resulting milk mass into blocks, and providing the blocks with a coaitng of a substance adapted to protect them from atmospheric agents.

4. Process for making solid, stable milk and cream preparations which consists in heating the milk, with the addition of sugar and a small amount of butter, with stirring in a vacuum until enough water is removed to cause the milk to form a mass capable of holding its shape, forming the resulting milk mass into blocks, and providing the blocks with a coating of a substance adapted to protect them from atmospheric agents.

5. Process for making solid, stable milk and cream preparations which consists in heating the milk, together with added sugar, with stirring in a vacuum until the water content is between 6 and 15%, forming the resulting milk mass into blocks, and providing the blocks with a coating of a substance adapted to protect them from atmospheric agents.

6. Process for making solid, stable milk and cream preparations which consists in heating the milk, together with added sugar, with stirring in a vacuum until enough water is removed to cause the milk to form a mass capable of holding its shape, forming the resulting milk mass into blocks, thoroughly cooling the blocks, and providing the cooled blocks with a coating of a substance adapted to protect them from atmospheric agents.

7. Process for making solid, stable milk and cream preparations which consists in heating the milk, together with added sugar, with stirring in a vacuum until enough water is removed to cause the milk to form a mass capable of holding its shape, forming the resulting milk mass into blocks, and providing the blocks with a coating of cocoa-butter.

8. As a new article of manufacture, a stable milk product comprising a block of solid milk containing 6–15% of water and coated with a substance adapted to protect it from atmospheric agents.

9. As a new article of manufacture, a stable milk product comprising a block of solid milk containing added sugar and 6–15% of water and coated with a substance adapted to protect it from atmospheric agents.

10. As a new article of manufacture, a stable milk product comprising a block of solid milk containing added sugar and 6–15% of water and coated with cocoa-butter.

11. Process for making solid stable milk and cream preparations which consists in pasteurizing the milk at not over 70° C., thereafter heating it together with added sugar, with stirring in a vacuum until enough water is removed to cause the milk to form a mass capable of holding its shape, forming the resulting mass into blocks, and providing the blocks with a coating of a substance adapted to protect them from atmospheric agents.

In testimony whereof I affix my signature.
PHILIPP BORN.